United States Patent [19]

Kessels et al.

[11] Patent Number: 4,686,670

[45] Date of Patent: Aug. 11, 1987

[54] METHOD OF SWITCHING TIME SLOTS IN A TDM-SIGNAL AND ARRANGEMENT FOR PERFORMING THE METHOD

[75] Inventors: Jozef L. W. Kessels; Alphons A. M. L. Bruekers, both of Eindhoven, Netherlands

[73] Assignee: U.S. Philips Corporation, New York, N.Y.

[21] Appl. No.: 785,315

[22] Filed: Oct. 7, 1985

[30] Foreign Application Priority Data

Jul. 15, 1985 [NL] Netherlands .................... 8502023

[51] Int. Cl.$^4$ ............................................ H04Q 11/04
[52] U.S. Cl. ........................................ 370/68; 370/66
[58] Field of Search ............................ 370/66, 68, 58

[56] References Cited

U.S. PATENT DOCUMENTS 4,312,063 1/1982 Warner ................................. 370/68
4,377,859 3/1983 Dunning et al. .................... 370/68
4,512,014 4/1985 Binz et al. ........................... 370/68
4,535,446 8/1985 Mountain ............................ 370/68

Primary Examiner—Douglas W. Olms
Attorney, Agent, or Firm—Thomas A. Briody; Jack Oisher; William J. Streeter

[57] ABSTRACT

A time switching method and apparatus for exchanging data words from a sequence of time slots in an incoming time-division multiplex frame to any other sequence of time slots an outgoing time-division multiplex frame. A data word in a given time slot s in an incoming frame is stored in a memory at an address $A(s)$ which is equal to the number of time slots $D_j$ in an outgoing frame for which j is less than s and for which $D_j$ exceeds $D(s)$. The data word already in the memory location address $A(s)$ and the data words in addresses higher than that address are each shifted to the next higher address. Data words at memory addresses lower than $A(s)$ are maintained at such addresses.

4 Claims, 6 Drawing Figures

| S | D(S) | A(S) |
|---|------|------|
| 0 | 3 | 0 |
| 1 | 4 | 0 |
| 2 | 2 | 2 |
| 3 | 7 | 0 |
| 4 | 5 | 1 |
| 5 | 0 | 5 |
| 6 | 6 | 1 |
| 7 | 1 | 6 |

$A(S) = (\underline{N}j : 0 \leq j < S : D(j) > D(S))$

METHOD OF SWITCHING TIME SLOTS IN A TDM-SIGNAL AND ARRANGEMENT FOR PERFORMING THE METHOD

BACKGROUND OF THE INVENTION

1. Field of the Invention

The invention relates to a method and apparatus for switching data words among time slots, the data words being applied in time-division multiplex to a time switching stage, and a data word $I_s$ in a time slot s (s=0, 1, 2, ..., n−1) of an incoming frame comprising n data words in n time slots being switched by the time switching stage to a time slot in an outgoing frame in which the data words $I_s$ have any other predetermined sequence D(s) D(s)=0, 1, 2, ..., n−1), the time switching stage comprising a memory for storing the data words.

2. Description of the Related Art

With the aid of time stages such as they are now used in switching systems for, for example, telephone exchanges, a number (N) of channels of identical capacities (C) are switched. To that end the time stage comprises inter alia a memory having a capacity of N words. For synchronously operated networks a memory capacity of N words is sufficient. If however the possibility must be created to switch N channels in plesiochronous networks whilst maintaining time slot integrity or if what are commonly referred to as multi-slot connections must be switched, then a memory having a larger (double) capacity must be available.

From European Patent Application No. EP 0012135 it is known to switch data words in the time slots of a PCM-frame bit-sequentially, the correct time sequence of the bits being guaranteed by delaying or not delaying the bits through a cycle period in the switching memory.

SUMMARY OF THE INVENTION

The invention provides a method and apparatus by which in a simple way and in accordance with a novel concept time slots can be exchanged in a bit-parallel time switching stage for N channels, the stage requiring a memory capacity of not more than N words and the method being suitable for establishing multi-slot connections, without extending the memory capacity. According to the invention, a method of exchanging time slots in a tdm-signal of the type defined in the opening paragraph is therefore characterized by the following steps:

(i) the data word $I_s$ of an incoming frame in time slot s is entered in the memory at an address A(s) which is equal to the number (Nj) of outgoing frame time slots having time slot numbers j less than s and for which it holds that D(j) exceeds D(s);

(ii) the data word already stored in the memory location having the address determined in step (i) and also the data words present in memory locations having an address higher than the address determined in step (i) are each entered in the next higher address;

(iii) the data words present in memory locations having an address lower than the address determined sub (i) are kept without change at the original address.

The invention also relates to a time switching stage for performing the method of switching data words, the data words being applied in time-division multiplex to the time switching stage and the data words in an incoming frame comprising n datawords $I_s$ (s=0, 1, 2, ..., n−1) always being switched by the time switching stage to an outgoing frame in which the data words $I_s$ have any other, predetermined sequence D(s) (D(s)=0, 1, 2, ..., n−1) and the time switching stage comprising a memory for storing the data words.

According to the invention, the time switching stage for performing the method of switching data words is characterized in that the memory is a random-access shift memory, that the time switching stage comprises an address generator for generating the address at which the data word applied to the shift memory is stored and that the time switching stage comprises means for shifting through one address location the content of the memory locations having an address equal to or higher than the generated address.

It is advantageous for the random access shift memory to comprise n, cascade-arranged memory cells $C_i$ (I=0, 1, 2, ..., n−1); that each cell comprises an address input, a data input and a clock input; that when address A(s) is applied to the address inputs of the cells, under the control of clock pulses applied to the clock inputs the cell $C_i$ where i=A(s) stores the applied data word and the cells of the order i where i>A(s) store the data words contained in the preceding cells which are, of the order (i−1).

The time switching stage is preferrably arranged such that each cell of the random-access shift memory comprises a register, a multiplexer and a comparator arrangement, that the comparator arrangement has a first input coupled to the address input, a second input coupled to an order indicator and an output connected to a controlinput of the multiplexer, that the multiplexer has a first input connected to an output of the register of the preceding cell, has a second input coupled to an output of the register of its own cell and a third input connected to the data input, that an output of the multiplexer is connected to the input of the register and that a control input of the register is connected to the clock input.

BRIEF DESCRIPTION OF THE DRAWINGS

The invention will now be described in greater detail by way of example with reference to the accompanying drawings, corresponding components in the figures having being given the same reference symbols. Therein.

DESCRIPTION OF THE PREFERRED EMBODIMENTS

Figure 1:
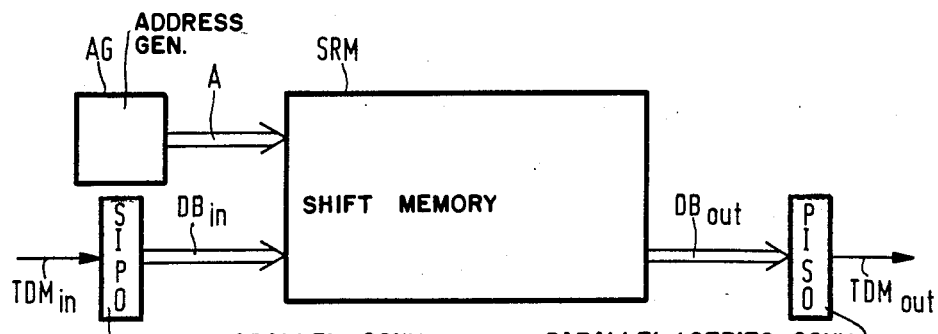
FIG. 1 shows a block diagram of a time switching stage according to the invention.

FIG. 1 shows a block diagram of a time switching stage according to the invention. An incoming time-division multiplex line TDM$_{in}$ is connected to an input of a shift memory SRM via a series/parallel converter SIPO. Digital information which is accomodated in a periodical frame structure is present on multiplex line TDM$_{in}$. Each frame comprises a number of time slots (for example 32), in each of which a data word formed by a number of bits (for example 8) can be accomodated, whilst time slots in corresponding positions in consecutive frames together form a data channel. The data word in a time slot—groups of n bits arranged in series—are converted by the series/parallel converter SIPO into groups of n parallel bits, which are applied via a data bus DB$_{in}$ to shift memory SRM and are entered into a memory location A(s) whose address is generated by an address generator AG and which is applied via address bus A to the shift memory SRM. An output of the shift memory SRM is connected to a parallel/series converter PISO via a data bus DB$_{out}$. At the output of this converter—on an outgoing time-division multiplex line TDM$_{out}$—a digital information stream is then also available, which stream is of the same composition as the stream on the incoming multiplex line TDM$_{in}$, but in which the sequence of the data words in an outgoing frame deviates from the sequence in an incoming frame.

Figure 2:
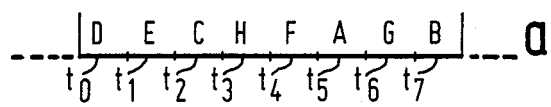
FIGS. 2a and 2b show the position of the data words in the time slots of the input frame and the output frame, respectively.
Figure 2:
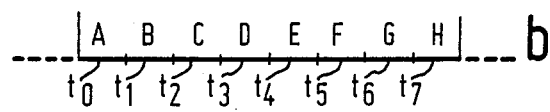

FIG. 2 shows by way of example an incoming and an outgoing frame structure. In FIG. 2a one frame is shown on the incoming time-division multiplex line TDM$_{in}$. The frame has 8 time slots $t_0, t_1, ..., t_7$ in which the respective data words D, E, C, H, F, A, G, B are accommodated. A frame on the outgoing multiplex line TDM$_{out}$ has also 8 time Slots $t_0, t_1, ..., t_7$ in which the same data words are located as in the frame shown in FIG. 2a, but in a different sequence: the time slots $t_0, t_1, t_2 ... t_7$ accommodate the respective data words A, B, C, D, E, F, G, H.

Figure 3:
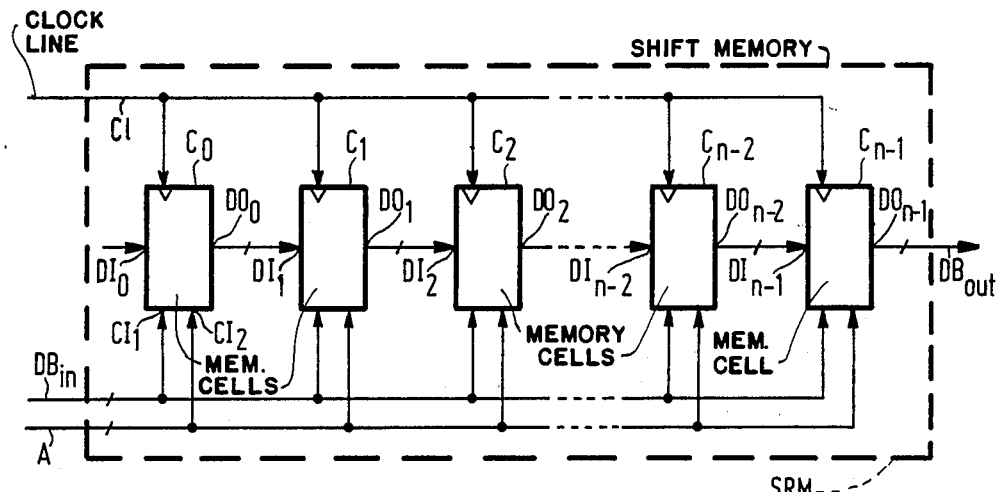
FIG. 3 shows an embodiment of a shift memory for use in a time switching stage of FIG. 1.

A shift memory SRM for use in the time switching system of FIG. 1 is shown in FIG. 3. The shift memory comprises n identical cells $C_i$ (i=0, 1, ..., n−1) which are serially interconnected. Each cell is capable of storing the n bits applied to first inputs $CI_1$ of the cells $C_i$ via databus DB$_{in}$. Addresses for cell $C_i$ are applied to the second input $CI_2$ of the cell $C_i$ via addresses bus A. The output $DO_i$ of, for example, cell $C_i$, is connected to the input $DI_{i+1}$ of the subsequent cell $C_{i+1}$. The shift memory SRM operates as follows. If an address A(s) is applied via the address bus A, and data via the databus DB$_{in}$ and a clock pulse via the clock line CL, than three situations must be distinguished for each cell $C_i$, namely:

(i) $A(s) > A_i$, to address of cell $C_i$ then the state of cell $C_i$ is not influenced;

(ii) $A(s) = A_i$, then cell $C_i$ takes over the data from databus DB$_{in}$;

(iii) $A(s) < A_i$ then cell $C_i$ takes over the data from cell $C_{i-1}$.

Put differently, the data words in the cells to the right of the addressed cell are each shifted one cell (to the right) and data word present on the databus is accommodated in the then free addressed cell. All the cells to the left of the addressed cell are not influenced.

The address A(s) is calculated as follows. The time slots in the frames are numbered from 0 to N−1. For each time slots in the input frame (FIG. 2a) it is specified in time slot a exchanging Table into which time slot D(s) of the output frame (FIG. 2b) the relevant data word must be entered. On the basis of such destination time slots D(s), the output generator generates the addresses A(s) for the shift memory SRM.

The address applied to the shift memory SRM for time slot s is designated A(s), where:

$$A(s) = \{N_j; 0 \leq j < s : D(j) > (s)\}$$

Expressed in words: the address applied to the shift memory SRM for time slot s is identical to the number of time slots $N_j$ which have a time slot number j less than s and, for which it holds that D(j) exceeds D(s) where $D_j$ are the output frame time slots. This rule is illustrated in FIG. 4 on the basis of the example shown in FIG. 2.

Figures 4A, 4B, 5:
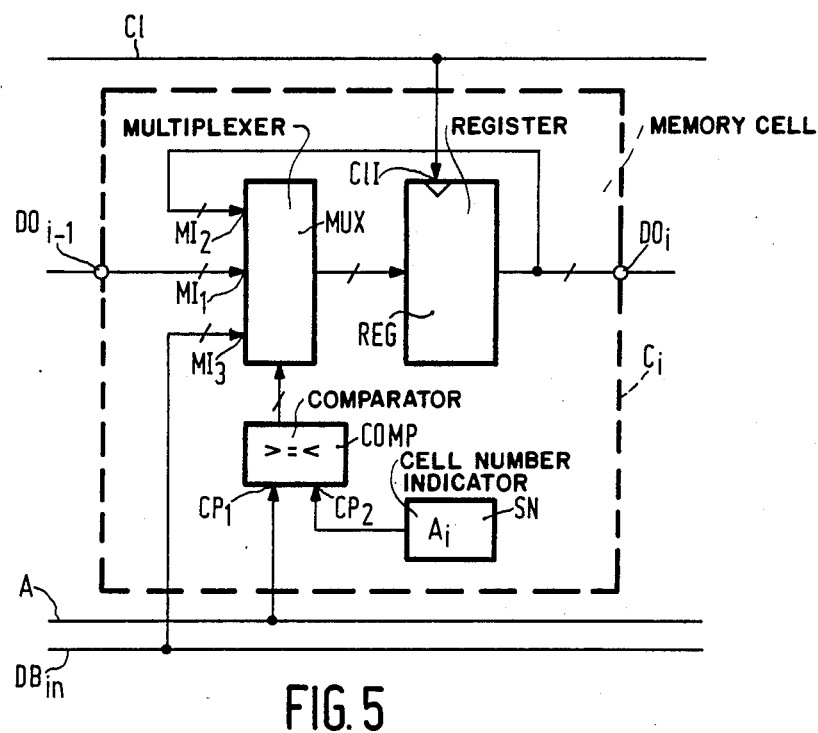
FIG. 4a shows a time slot exchange Table for use in the time switching stage of FIG. 1.
FIG. 4b illustrates the content of the shift memory as a function of the (clock)time when the method and arrangement according to the invention are used.
FIG. 5 is a detailed circuit diagram of an embodiment of one cell of a shift memory as shown in FIG. 3.

FIG. 4a illustrates the time slot exchanging Table. Column 1 of this Table—"s"—shows the numbers of the time slots of the input frame as shown in FIG. 2a. Column 2 of the Table—"D(s)"—shows the time slot numbers of the destination time slots in the output frame as is shown in FIG. 2b. Column 3 of the table—"A(s)"—shows the addresses such as they have been generated by the address generator in accordance with the above rule. This produces the following results: thus it is ascertained at line 1 (s=0; D(s)=3) of the Table that the address applied is equal to 0(A(s)=0), as the number of time slots having a time slot number j less than s is zero since in this instance s=0 and also there is no time slot for which D(j)>3), is equal to zero. For line 2 (s=1, D(s)=4) it is also found that A(s)=0. Hence, since s=1, there is one time slot number j, namely j=0, which is less than s. However, none of the time slots for which D(j)>4 are equal to zero (since D(0)<D(1)). At line 3 (s=2, D(s)=2) it is found that A(s)=2 since the number of time slots having a time slot number j less than s is equal to 2, namely both D(1) and D(0), and for both such time slots Dj>2. The further lines of the Table are derived correspondingly.

For this same example FIG. 4b shows in what manner the shift memory effects the time slot exchange if the input data shown in FIG. 2a and the addresses of column 3—"A(s)"—of the Table of FIG. 4a are applied to this memory. At instant t=0 the data in the $0^{th}$ time slot of the input frame ("D") is applied to the shift register together with address A(0)=0. This implies that this data word is stored in cell $C_o$. At instant t=1 the data in the first time slot of the input frame ("E") is applied together with address A(1)=0 to the shift memory. This implies that this data word is stored in cell $C_o$ and that the data word already present there is shifted one cell forward. At instant t=2 the data in the second time slot ("C") is applied to the shift memory together with the address A(2)=2. The implies that this data word is stored in cell $C_2$. At instant t=3 the data in the third time slot ("H") is applied to the shift memory together with address A(3)=0. This implies that this data word is stored in cell $C_o$ and that the remaining data words are shifted through one cell. At instant=4 the data in the fourth slot of the input frame ("F") is applied to the shift register together with address A(4)=1. This implies that this data word is stored in cell $C_1$ whilst the data word already present there and the data words to the "right" thereof are shifted one cell. The data words in the remaining time slots of the frame and also the data words in time slots of subsequent frames are applied in this manner to the shift memory.

When the shift memory is completely full, that is to say at the end of a frame (in this example at the end of the seventh time slot) then there appears at the output of the last cell (in the present example cell $C_7$) the data word of the $0^{th}$ time slot of the output frame ("A"). (see line t=8, FIG. 4b). One time slot period later the data word of the first time slot of the output frame ("B") appears, etc.

FIG. 5 shows a practical embodiment of a shift memory, showing one cell—$C_1$. The other cells are identical to this cell and are therefore not shown. Cell $C_i$ incorporates a multiplexer MUX which has a first input of $MI_1$ connected to an output $DO_{i-1}$ of cell $C_{i-1}$, a second input $MI_2$ connected to the output $DO_i$ of cell $C_i$ and a third input $MI_3$ connected to the data bus $DB_{in}$. A comparator arrangement COMP is connected to a control input of the multiplexer MUX. A first input $CP_1$ of the comparator arrangement COMP is connected to the address bus A and a second input $CP_2$ is connected to a number indicator SN. The comparator arrangement has for its function to compare the addresses connected to the address bus with the address $A_i$ which supplies number indicator SN (the latter is preset to the number of the cell). If the address at the address bus A is equal to the address of the cell $A_i$ then the third input $MI_3$ of the multiplexer MUX is switched through to the input of a register REG connected to the multiplexer. If the address at the address bus A exceeds $A_i$ then the second input $MI_2$ of the multiplexers MUX is switched through to the input of the register REG. If in contra distinction therewith the address at the address bus A is less than $A_i$ then the first input $MI_1$ of the multiplexer MUX is switched through to the input of the register REG. The register further has a clock signal input CLi which is connected to the clock line C1.

It is however not necessary for the cell to have an individual comparator arrangement connected to it. It is conceivable that a central comparison arrangement is used for all the cells together The structure of the shift memory SRM is an appropriate structure for assembling one large SRM, assembled from a plurality of smaller memories, so that a time switching stage of basically unlimited dimensions can be build up at one module.

The arrangement for exchanging time slots in a tdm-signal has the advantages that the required memory capacity can be kept to a minimum, the further required means being of a simple nature and small bulk.

It will be obvious that for the principle of the invention it is not important whether, as described in the foregoing, the data words are entered into predetermined addresses and become available in an well-ordered sequence way at the output ($DB_{out}$, FIG. 3) or that the principle is realised the other way round. In the latter case the data words will be applied one by one to the input ($DI_o$, FIG. 3) of the first cell $C_o$ of the shift memory SRM and the data word present in the cell indicated by the address A(s) and the address A will be read via the databus $DB_{in}$. After the data word in, for example, cell $C_i$ has been read via the databus $DB_{in}$ the words of all the cells $C_j$ where j i is shifted forth one cell and a new data word is entered into the first cell $C_o$.

The method and arrangement may alternatively be utilized for realising a variable, adjustable delay of data words, as, if a fixed address is applied to the address bus A (FIG. 3) all the incoming data words will be entered in the cell associated with the address and, after the data words have passed through the remaining cells of the shift memory SRM, will become available at the output $DB_{out}$. Using a shift memory having N cells it will consequently be possible to produce a N-step adjustable delay. The delay time is not more than $N \times \tau$ where $\tau$ is the duration of one clock period. If address A(s)=1 is applied, the data words will all appear at the output after a delay of (N−1) seconds.

What is claimed is:

1. A method of switching data words in time slots, the data words being applied in time-division multiplex to a time switching stage, and a data word $I_s$ in a time slot s (s=0, 1, 2, ..., n−1) of an incoming frame comprising n data words $I_s$ in n time slots s being switched by the time switching stage to a time slot D(s) in an outgoing frame in which the data words $I_s$ have any other predetermined sequence D(s), where D(s)=0, 1, 2, ... n−1, and the time switching stage comprises a memory for storing the data words, such method being characterized in that it comprises the following steps:
   (i) the data word $I_s$ in an incoming time slot s is entered in the memory at an address A(s) which is equal to the number of outgoing time slots $D_j$ for which j is less than s and for which D(j) exceeds D(s);
   (ii) The data word already stored in the memory location having the address determined in step (i) and also the data words present in memory locations having an address higher than the address determined in step (i) are each shifted to the next higher address; and
   (iii) the data words present in memory locations having an address lower than the address determined sub (i) are maintained without change in the original address.

2. A time switching stage for switching data words in time slots, the data words being applied in time-division multiplex frames to the input of such time switching stage and the data words in an incoming frame comprising n data words $I_s$ (s=0, 1, 2, ... n−1) being switched by such time switching stage to an outgoing frame in which the data words of $I_s$ have any different, predetermined sequence D(s) (D(s)=0, 1, 2, ..., n−1); such time switching stage comprising a random access shift register for storing the data words, an address generator for generating the address at which a data word applied to the shift register is stored therein, and means for shifting through one address position the content of memory locations in said shift register having an address equal to or higher than the generated address.

3. A time switching stage as claimed in claim 2, further characterized in that the random access shift memory comprises n cascade-arranged cells $C_i$ (i=0, 1, 2, ..., n−1), each cell having an input, an output, an address input, a data input and a clock input; and that an address A(s) applied to the address inputs of the cells under the control of the clock pulses applied to the clock inputs thereof causes the cell $C_i$ having an address number i for which i=A(s) to store the applied code word, and causes the cells having an address number i for which i>A(s) to store the data words which are stored in the preceding cells having address numbers (i−1).

4. A time switching stage as claimed in claim 3, further characterized in that each cell of the random access shift memory comprises a register, multiplexer and a comparator arrangement; such comparator arrangement having a first input coupled to the address input, a second input to a cell number indicator, and an output connected to a control input of said multiplexer; said multiplexer having a first input connected to an output of the register of the preceding cell, a second input coupled to an output of the register of its cell, a third input connected to the input of the time switching stage, and an output connected to an input of such register; and a control input of such register being connected to the clock input of its cell.

* * * * *